United States Patent [19]

Wakabayashi et al.

[11] Patent Number: 5,802,094
[45] Date of Patent: Sep. 1, 1998

[54] NARROW BAND EXCIMER LASER

[75] Inventors: Osamu Wakabayashi; Masahiko Kowaka; Yukio Kobayashi, all of Hiratsuka, Japan

[73] Assignee: Kabushiki Kaisha Komatsu, Seisakusho, Japan

[21] Appl. No.: 728,448

[22] Filed: Oct. 10, 1996

Related U.S. Application Data

[63] Continuation-in-part of Ser. No. 573,593, Dec. 15, 1995, Pat. No. 5,596,596, which is a continuation of Ser. No. 164,613, Dec. 8, 1993, abandoned, which is a continuation of Ser. No. 775,998, Nov. 14, 1991, abandoned.

[51] Int. Cl.$^6$ ............................................. H01S 3/22
[52] U.S. Cl. ............................ 372/57; 372/9; 372/98; 372/108; 372/100; 372/102
[58] Field of Search ............................ 372/9, 57, 98, 372/108, 100, 102

[56] References Cited

U.S. PATENT DOCUMENTS

| | | | |
|---|---|---|---|
| 4,264,141 | 4/1981 | Guers et al. | 350/486 |
| 4,829,536 | 5/1989 | Kajiyama et al. | 372/57 |
| 4,873,692 | 10/1989 | Johnson et al. | 372/20 |
| 4,905,243 | 2/1990 | Lokai et al. | 372/32 |
| 4,914,662 | 4/1990 | Nakatani et al. | 372/32 |
| 4,918,704 | 4/1990 | Caprara et al. | 372/99 |
| 4,926,428 | 5/1990 | Kajiyama et al. | 372/20 |
| 4,953,175 | 8/1990 | DeSilvestri et al. | 372/95 |
| 4,961,195 | 10/1990 | Skupsky et al. | 372/31 |
| 4,985,898 | 1/1991 | Furuya et al. | 372/106 |
| 4,991,178 | 2/1991 | Wani et al. | 372/32 |
| 5,404,366 | 4/1995 | Wakabayashi et al. | 372/57 |

OTHER PUBLICATIONS

Itoh, et al., "An analytical Study of the Echelette Grating with Application to Open Resonators," *IEEE Transactions on Microwave Theory and Techniques*, vol. MTT17, No. 6, pp. 319–327.

Armandillo, et al., "Estimation of the Minimum Laser Linewidth Achievable With a Grazing–Grating Configuration," *Optics Letters*, vol. 8, No. 5, pp. 274–276.

Bobrovskii, et al., "Continuously Tunable Tea $CO_2$ Laser," *Soviet Journal of Quantum Electronics*, vol. 17, No. 9, pp. 1157–1159.

Publication *Laser Handbook*, The Laser Society of Japan.

*Primary Examiner*—Leon Scott, Jr.
*Attorney, Agent, or Firm*—Welsh & Katz, Ltd.

[57] ABSTRACT

A narrow band excimer laser capable of easily adjusting the rotation of the laser beam by an image rotator provided between a laser chamber and a grating and on the laser beam optical axis. The image rotator is supported with freedom of rotation on the laser beam optical axis and rotates the laser beam about the optical axis so that the plane containing the direction in which the width of the laser beam incident upon the beam expander is narrower is parallel with the plane containing the beam-expansion direction of the beam expander, and the beam expansion direction of the laser beam incident upon the grating is perpendicular to the direction of the grooves of the grating. With this arrangement, a laser beam of narrowed bandwidth can be obtained with high efficiency.

7 Claims, 5 Drawing Sheets

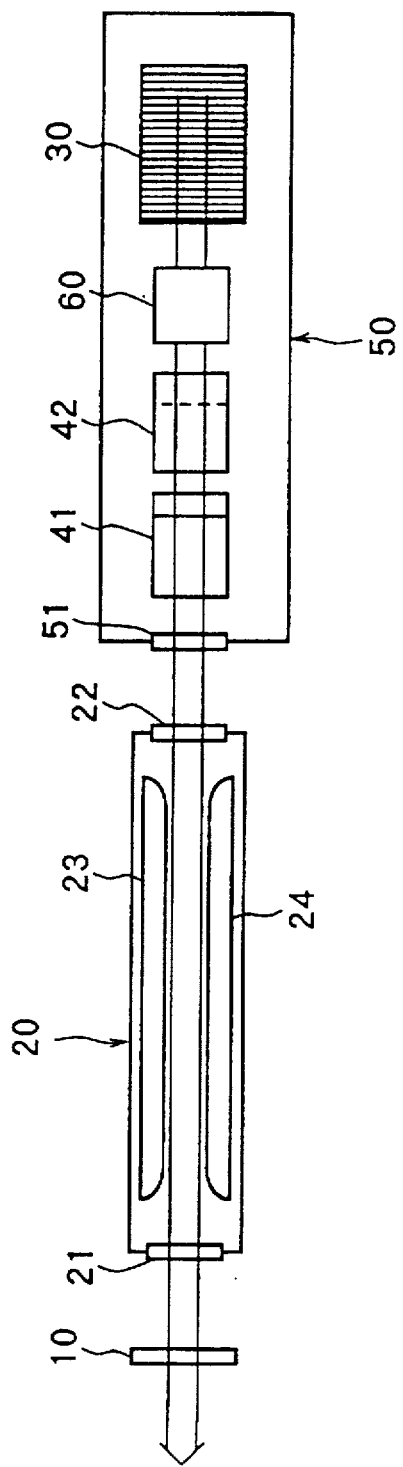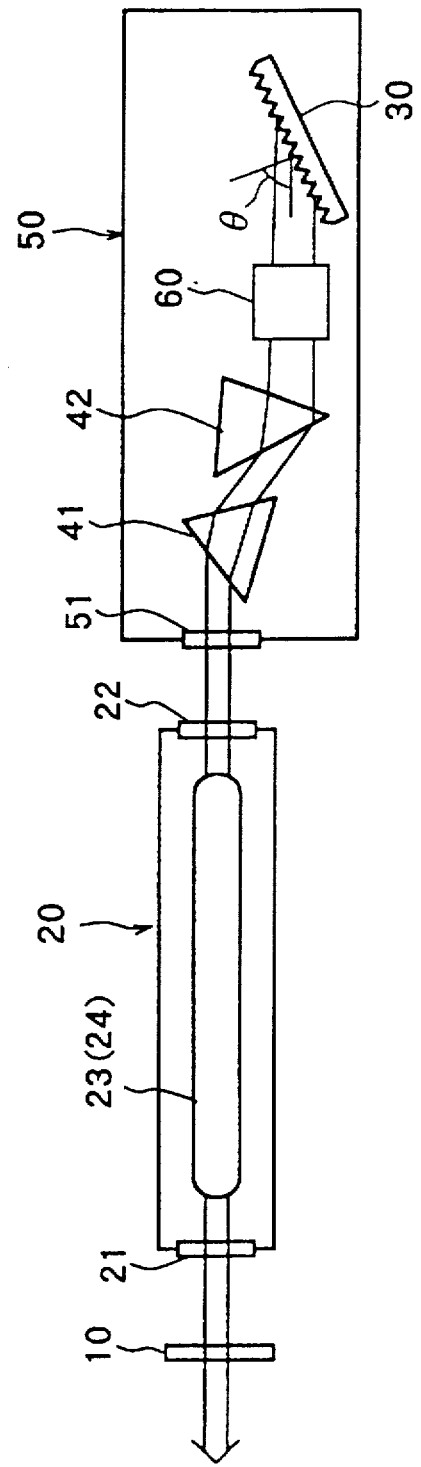

NARROW BAND EXCIMER LASER

This application is a continuation-in-part of Ser. No. 08/573,593, filed Dec. 15, 1995, now U.S. Pat. No. 5,596,596; which is a continuation of patent application Ser. No. 08/164,613, filed Dec. 8, 1993 (abandoned); which is continuation of patent application Ser. No. 07/775,998, filed Nov. 14, 1991 (abandoned).

BACKGROUND OF THE INVENTION

1. Field of the Invention

This invention relates to a narrow band excimer laser which uses a grating as a wavelength-selecting element, and more particularly, it relates to a narrow band excimer laser which is suitable for use as the light source of a reduction projection aligner.

2. Description of the Related Art

The U.S. patent application Ser. No. 08/573,593 discloses a narrow band excimer laser which is arranged in such a way that the direction of electric discharge between electrodes (hereinafter called electrode discharge direction) is perpendicular to the laser beam expansion direction by a beam expander, and the electrode discharge direction is parallel to the direction of the grooves of the diffraction grating. By this arrangement, narrowing of the bandwidth of the output laser beam can be achieved with high efficiency.

However, such an arrangement requires various optical elements, such as the prism beam expander and the grating, used to ensure that the electrode discharge direction is perpendicular to the laser beam expansion direction and the electrode discharge direction is parallel with the direction of the grooves of the grating, while the spectral width of laser beam is affected by the precision of the positioning of these optical elements. Therefore, these optical elements must be situated at precise positions so that even when a large number of laser apparatuses are manufactured, the same narrow spectral width can be obtained in all the laser apparatuses.

Arrangements are therefore adopted in which optical elements such as the prism beam expander and the grating are secured on a platform which is secured inside a housing which has been filled with an inert gas (such as nitrogen) in order to prevent the optical elements from being damaged and soiled.

Nonetheless, when such an arrangement is adopted, there are problems. Namely, it is difficult to make positional adjustments by making minute adjustments to the housing so as to achieve a right angle between the electrode discharge direction and the laser beam expansion direction, and processing errors in parts cannot be ignored particularly when a large number of laser apparatuses are to be produced so that the electrode discharge direction cannot always be positioned perpendicular to the laser beam expansion direction in all the laser apparatuses.

SUMMARY OF THE INVENTION

Thus, an object of this invention is to provide a narrow band excimer laser in which the rotation of the laser beam can be easily adjusted so that the plane containing the direction in which the width of the laser beam incident upon the beam expander is narrower is parallel with the plane containing the beam-expansion direction of the beam expander, and the beam expansion direction of the laser beam incident upon the grating is perpendicular to the direction of the plurality of grooves of the grating, thus making it possible to obtain output laser beam of narrow bandwidth with high efficiency.

In order to achieve the above object, a narrow band excimer laser according to this invention comprises a laser chamber filled with a laser gas; a laser beam output coupling mirror (front mirror) provided to one side of the laser chamber; a grating having a plurality of grooves provided to another side of the laser chamber, for acting as a wavelength-selecting element; and a beam expander provided between the laser chamber and the grating, whereby a laser beam of narrowed bandwidth is output through the laser beam output coupling mirror by irradiating a laser beam generated by the electric discharge excitation in the laser chamber onto the grating via the beam expander, wherein the narrow band excimer laser further comprises an optical element provided between the laser chamber and the grating on an optical axis of the laser beam, for rotating the laser beam about the optical axis thereof; and supporting means for supporting the optical element and rotating the optical element about the optical axis of the laser beam, wherein the laser beam is rotated by the rotation of the optical element by using the supporting means to make adjustments such that a plane containing a direction in which a width of the laser beam incident upon the beam expander is narrower is parallel with a plane containing a direction of beam-expansion by the beam expander, and the beam expansion direction of the laser beam incident upon the grating is perpendicular to a direction of the plurality of grooves of the grating.

The optical element may be positioned between the laser chamber and the beam expander.

Alternatively, the optical element may be positioned between the grating and the beam expander.

The optical element may be an image rotator which may comprise a dove prism.

Alternatively, the image rotator may comprise at least two mirrors disposed in a predetermined positional relation.

These mirrors may bend the traveling direction of the laser beam by substantially a right angle.

In this invention, because it is easy to carry out adjustments of the arrangement such that the plane containing the direction in which the width of the laser beam incident upon the beam expander is narrower is parallel with the plane containing the beam-expansion direction of the beam expander, and the beam expansion direction of the laser beam incident upon the grating is perpendicular to the direction of the plurality of grooves of the grating, it follows that it is possible to make the spectral width of the output laser beam as narrow as the optical elements possibly preform and also to shorten the time to adjust the spectral width. In addition, because the present invention makes it possible to perform the optimal adjustments for the optical axis of a laser cavity, laser beam can be oscillated at high efficiency and a large number of laser apparatuses with a stable spectral width quality can be manufactured.

BRIEF DESCRIPTION OF THE DRAWINGS

FIG. 4 is a side view of a third embodiment of a narrow band laser according to this invention.

FIG. 5 is an overhead plan view of the third embodiment shown in FIG. 4.

DESCRIPTION OF THE PREFERRED EMBODIMENTS

Embodiments of a narrow band excimer laser according to this invention will be described in detail below with reference to the accompanying drawings.

Figure 1:
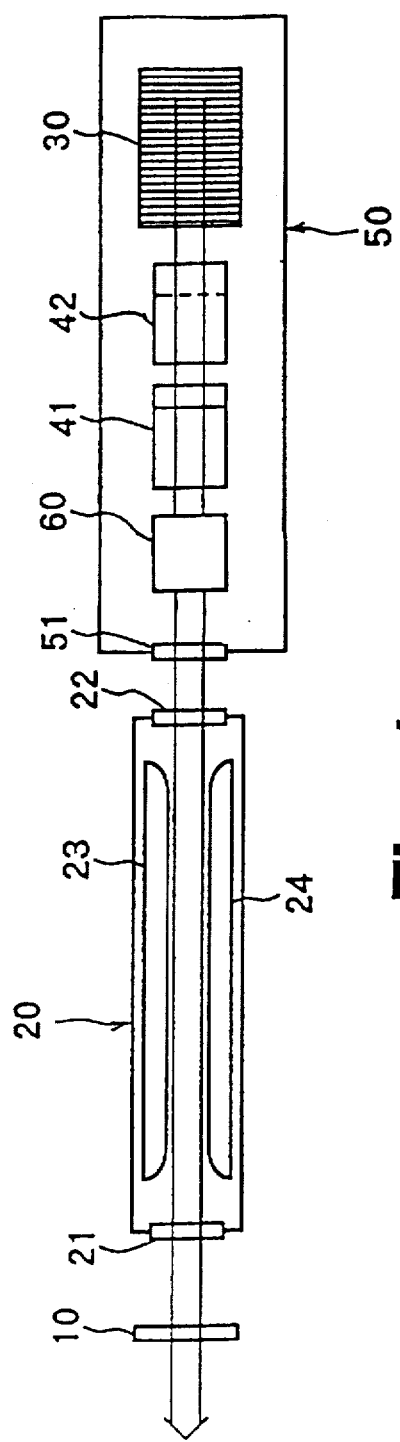
FIG. 1 is a side view of a first embodiment of a narrow band laser according to this invention.
Figure 2:
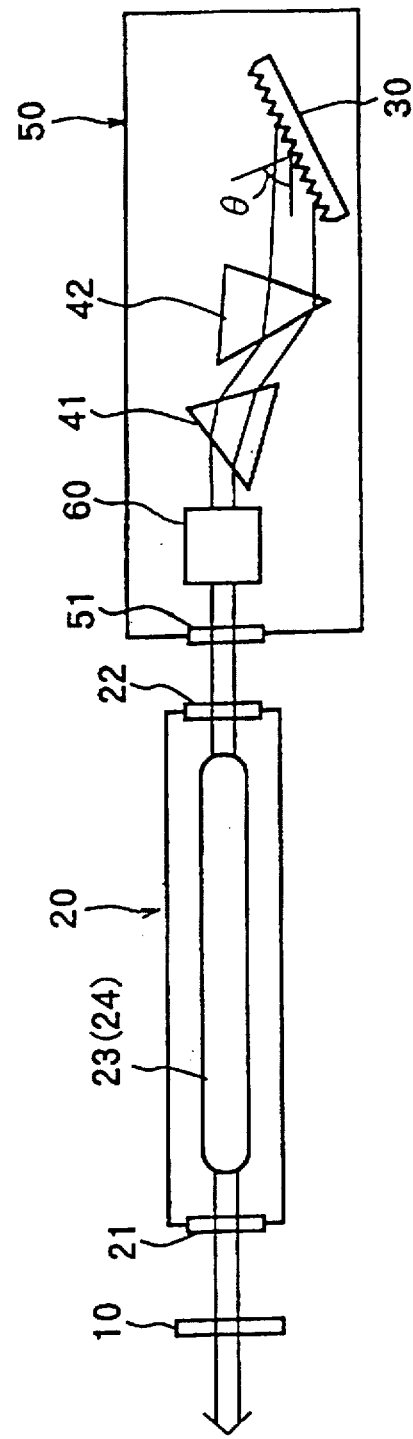
FIG. 2 is an overhead plan view of the first embodiment shown in FIG. 1.

Referring to FIG. 1 and FIG. 2 illustrating a first embodiment, the narrow band excimer laser of the first embodiment comprises a front mirror 10, a laser chamber 20, a grating 30 which functions as a rear mirror, prisms 41 and 42 which constitute a beam expander, and an image rotator 60.

Inside the laser chamber 20, a combination of Kr, $F_2$, Ne or a combination of Ar, $F_2$, Ne or the like is sealed as the laser gas, and electrodes 23 and 24 (anode and cathode) are provided for the excitation of this laser gas by electric discharge. Electric power for the discharge is supplied to the electrodes 23 and 24 from a power source circuit, which is not shown, to cause electric discharge therebetween. The laser chamber 20 is provided with windows 21 and 22 through which the radiated laser beam passes.

The windows 21 and 22 are made of a material such as metal fluoride (CaF, etc.), and are arranged in such a way that they suffer little corrosion due to halogen gases in the laser gas, and allow the ultraviolet rays of the excimer laser to pass therethrough efficiently.

Further, the prisms 41 and 42 which constitute the beam expander and the grating 30 which serves as a wavelength-selecting element are housed inside a housing 50. The housing 50 is filled with an inert gas such as nitrogen gas thereby enveloping the prisms 41 and 42 and the grating 30 in an atmosphere of the inert gas and preventing them from being soiled or damaged. The nitrogen gas or the like is continuously supplied to the inside of the housing 50 from a gas cylinder which is not shown, and continually leaks from a gap provided in the housing 50 so that the housing 50 is always full of new gas. The housing 50 is provided with a window 51 made of a material which allows ultraviolet light to pass therethrough.

The beam expander constituted by the prisms 41 and 42 has the function of expanding the laser beam which has passed through the window 22 and irradiating it onto the grating 30.

The front mirror 10 comprises a half mirror through which a part of the laser beam which has passed through the window 21 returns to the inside of the laser chamber 20 while the remaining part passes therethrough and is taken out as the output laser beam.

Further, the image rotator 60 is provided in the housing 50 on the laser optical axis. The image rotator 60 rotates the laser beam passing through the window 51 by a predetermined angle and send it to the beam expander.

The grating 30 selects light of a specific wavelength using diffraction of light, and is formed with a plurality of grooves arrayed in a fixed direction. The grating 30 performs the operation of selecting laser beam of a specific wavelength by varying the angle θ between the plane containing the plurality of grooves and the laser beam irradiated from the beam expander. More specifically, the grating 30 reflects only specific light corresponding to the angle θ of the grating relative to the incident light, in a predetermined direction (in the direction of the incident light in this case) and thus performs the operation of selecting light of a specific wavelength.

According to this embodiment, output laser beam of narrowed bandwidth is obtained with high efficiency by having an arrangement such that the plane containing the direction in which the width of the laser beam incident upon the beam expander is narrower is parallel to the plane containing the beam expansion direction of the beam expander, the beam expansion direction of the laser beam incident upon the grating 30 is perpendicular to the direction of the grooves of the grating 30, and the image rotator 60 is provided on the laser beam optical axis between the window 22 and the window 51 so that the plane containing the direction in which the width of the laser beam incident upon the beam expander is narrower is parallel to the plane containing the beam expansion direction of the beam expander with a high degree of precision.

In general, the widening angle of the laser beam output from the window 22 of the laser chamber 20 is smaller in the direction perpendicular to the discharge direction between the electrodes 23 and 24, which is to say the direction in which the electrodes 23 and 24 are arrayed, than it is in the discharge direction. Here, if the plane containing the direction in which the width of the laser beam incident upon the beam expander is narrower is parallel with the plane containing the beam-expansion direction of the beam expander, and the beam expansion direction of the laser beam incident upon the grating 30 is perpendicular to the direction of the plurality of grooves of the grating 30, then beam widening in the grating 30 can be kept to a minimum, thereby making it possible to narrow the bandwidth with good efficiency.

By providing the image rotator 60 on the laser beam optical axis between the window 22 and the window 51, it is possible to make adjustments such that the plane containing the direction in which the width of the laser beam incident upon the beam expander is narrower is parallel with the plane containing the beam-expansion direction of the beam expander with a high degree of precision.

The role of the image rotator 60 is now described in detail.

The excimer laser is a pulse oscillation laser in which the number of times laser beam can go back and forth in the light resonator (laser cavity) between the half mirror 10 and the grating 30 within the discharge excitation time is of the order of a few times, and the laser beam emitted from the windows 21 and 22 has a widening angle which is larger in the direction of the electric discharge than in the direction perpendicular to the electric discharge direction.

Further, the closer to be mutually in parallel between the plane containing the direction in which the width of the laser beam incident upon the beam expander is narrower and the plane containing the beam-expansion direction of the beam expander, the better the wavelength-selection efficiency and the narrower the spectral width.

In order to approach closer to parallel between the plane containing the direction in which the width of the laser beam output from the inside of the laser chamber 20 to the outside is narrower and the plane containing the beam-expansion direction of the beam expander, the rate of beam expansion by the beam expander constituted by the prisms 41 and 42 has to be made large.

Thus, the beam expander constituted by the prisms 41 and 42 expands the laser beam in the direction in which the beam-widening angle of the laser beam output from the laser chamber 20 is small. In other words, the arrangement is such that the plane containing the direction in which the width of the laser beam is narrower and the plane containing the beam-expansion direction of the beam expander are parallel to one another when the laser beam is incident upon the beam expander.

In this invention, an image rotator 60 is used in order to improve the precision and reproducibility with which the plane containing the direction in which the width of the laser beam is narrower and the plane containing the beam-expansion direction of the beam expander are parallel to one another when the laser beam is incident upon the beam expander.

When the laser chamber 20 and the housing 50 are fixedly positioned, it is not necessarily the case that the plane containing the direction in which the width of the laser beam is narrower and the plane containing the beam-expansion direction of the beam expander are parallel to one another when the laser beam is incident upon the beam expander.

By rotating the image rotator 60, the laser beam is rotated about the optical axis, and the plane containing the direction in which the width of the laser beam is narrower and the plane containing the beam-expansion direction of the beam expander become parallel to one another with a good degree of precision when the laser beam is incident upon the beam expander. In the production of a large number of laser apparatuses, fine adjustments are made by the image rotator 60 to positioning errors for each product.

Here, it is also conceivable to make adjustments by rotating the laser chamber 20 and/or the housing 50, but this is almost impossible in view of their weight and size, and adjustments by rotating the extremely light image rotator 60 are clearly better in view of their workability.

In order to improve the efficiency of wavelength selection, the beam expander and the grating 30 are positioned such that the beam-expansion direction of the laser beam incident upon the grating 30 is perpendicular to the direction of the grooves of the grating 30.

Figure 3:
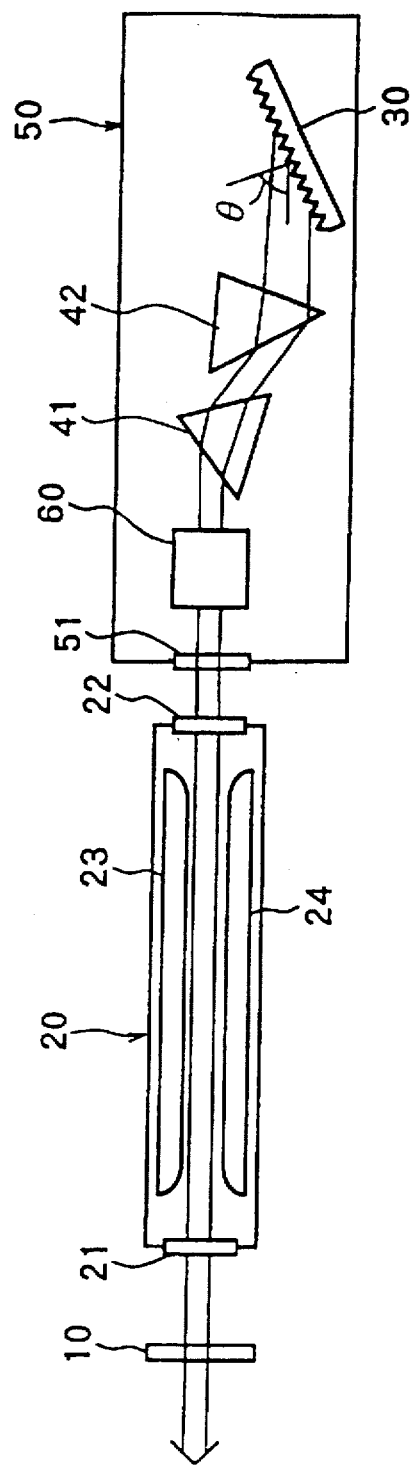
FIG. 3 is a side view of a second embodiment of a narrow band laser according to this invention.

FIG. 3 shows the second embodiment of a narrow band excimer laser of this invention, in which the narrow band excimer laser is seen from the same direction as FIG. 1.

In FIG. 3, the positioning of the prisms 41 and 42 inside the housing 50 in the narrow band excimer laser is the same as in FIG. 2.

More specifically, in the arrangement of FIG. 3, the image rotator 60 is positioned so as to rotate the laser beam by approximately 90° so that the narrow width direction of the laser beam emitted from the window 22 is the direction perpendicular to the surface of the page.

FIG. 4 and FIG. 5 show the third embodiment of this invention in which the image rotator 60 is situated between the prism 42 and the grating 30, FIG. 4 being a view seen from the direction in which the discharge direction of the electrodes 23 and 24 is within the plane of the page, and FIG. 5 being a view seen from the direction of the electrode 23.

With this arrangement, it is possible to make high-precision adjustments so that the beam expansion direction of the laser beam incident upon the grating is perpendicular to the direction of the plurality of grooves of the grating by making fine adjustments to the rotation of the image rotator 60.

With this arrangement, it is also possible to situate the image rotator 60 in the nitrogen atmosphere as well to protect the image rotator 60 which needs careful handling, although this does require that a means for rotating and finely adjusting the image rotator 60 be able to be operated from outside the housing 50.

The position in which the image rotator 60 is situated may also be between the prisms 41 and 42. In any arrangement of the image rotator 60, the result of the arrangement should contribute to easy adjustments to realize that the plane containing the direction in which the width of the laser beam is narrower and the plane containing the beam-expansion direction of the beam expander are parallel to one another when the laser beam is incident upon the beam expander, and the beam-expanded direction of the laser beam incident upon the grating is perpendicular to the direction of the plurality of grooves of the grating.

Figure 6:
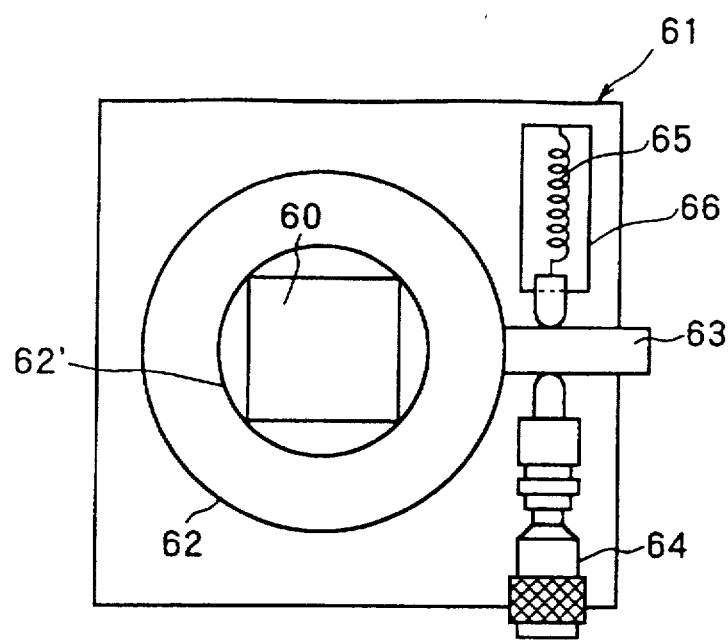
FIG. 6 is an overhead plan view of an image rotator used by the narrow band laser according to this invention.
Figure 7:
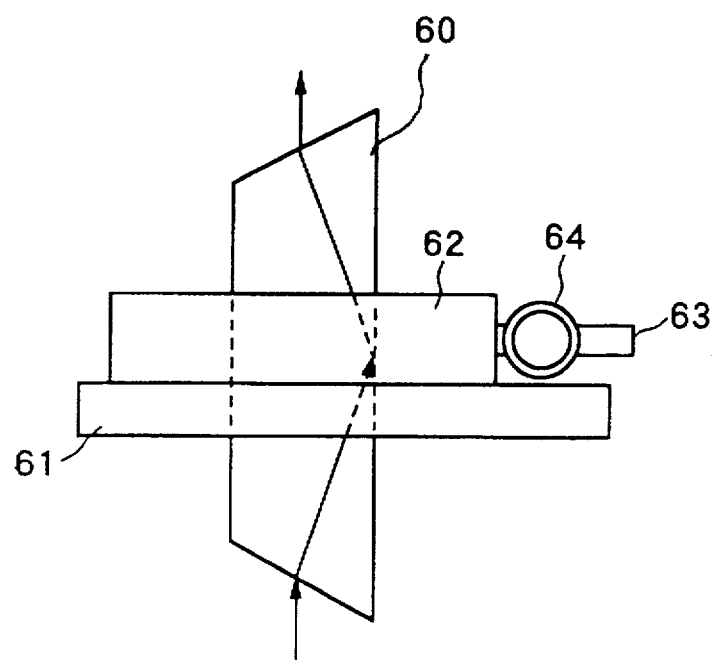
FIG. 7 is a side view of the image rotator shown in FIG. 6.

FIG. 6 and FIG. 7 illustrate an example of a mechanism for rotating the image rotator 60. Such a mechanism is widely known in the field of the art as a rotation stand for this type of optical part.

More specifically, in FIG. 6, there is a rotational stand 62 on a platform 61, and the rotational stand 62 holds and secures the image rotator 60 on the inside of a hole 62'. Further, a member 63 which is formed integral with the rotational stand 62 is positioned so as to be sandwiched by a micrometer 64 and a support means 66 which incorporates a spring 65, and the rotational stand 62 is driven in rotation, via the member 63, by means of the micrometer 64.

FIG. 7 is a side view of the mechanism for rotating the image rotator 60 of FIG. 6 in which an image rotating prism (dove prism) is used as the image rotator 60.

Figure 8:
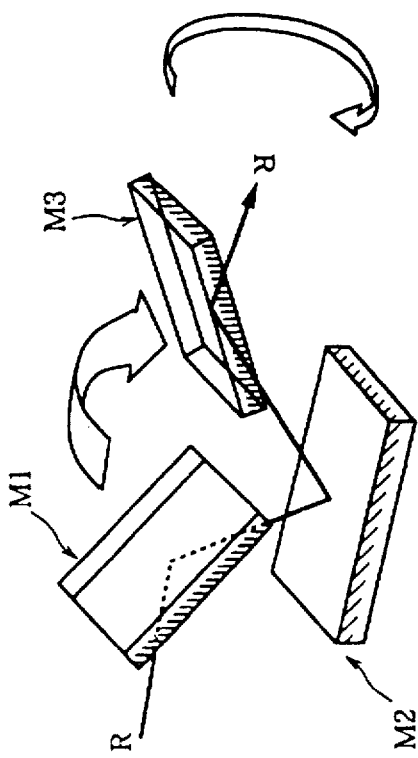
FIG. 8 is a diagram explaining a fourth embodiment of the narrow band laser according to this invention.

FIG. 8 illustrates another example of the image rotator 60 which employs three mirrors instead of using the image-rotating prism shown in FIG. 7. For the image rotator 60 constituted by such three mirrors, the laser beam will hardly pass through the inside of the image rotator so that there is the advantage that there is very few absorption and dispersion losses due to the image rotator constituent material. To rotate the image rotator constituted by such three mirrors, a known tilt stand or the like may be used.

The monitor parameter for optimizing the rotation position of the image rotator 60 is the spectral width. The spectral width can be detected using a known wavelength monitoring means for narrow band excimer lasers.

Figure 9:
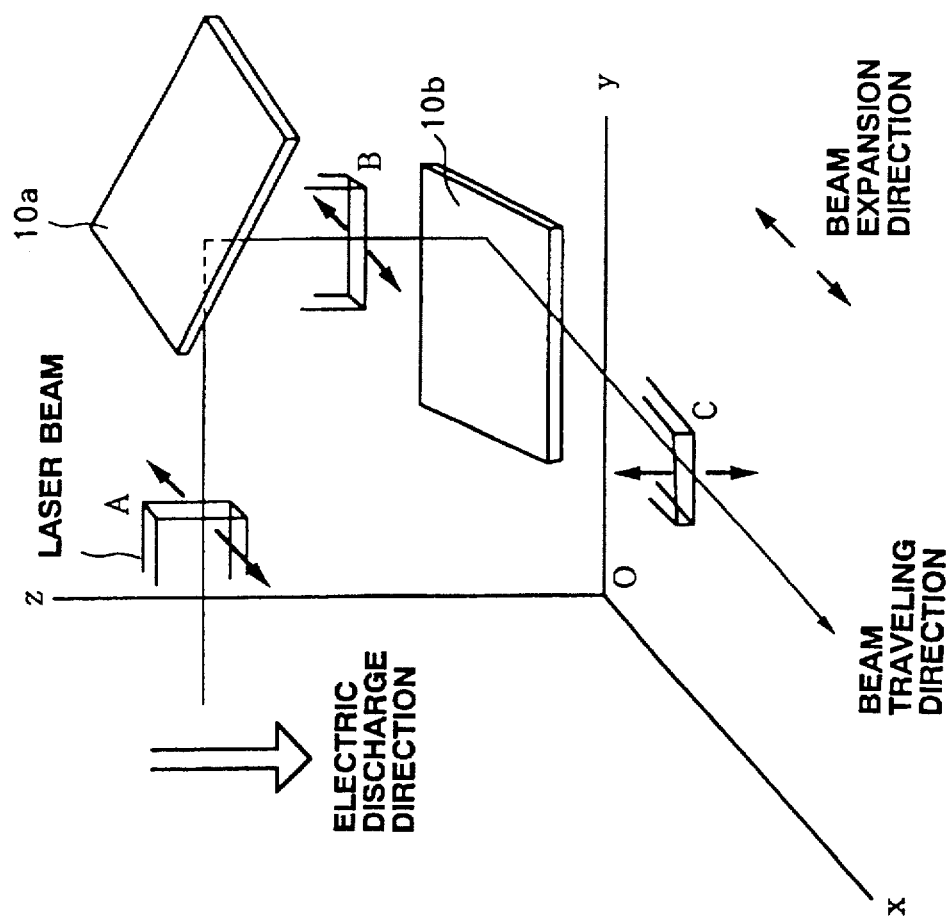
FIG. 9 is a diagram explaining another embodiment of the narrow band laser according to this invention.

FIG. 9 shows the fourth embodiment of a narrow band excimer laser of this invention.

As described in relation to the first embodiment shown in FIG. 1, the light passing through the window 22 from the inside of the laser chamber 20 to the outside has a width which is narrower in the direction perpendicular to the discharge direction than the width in the discharge direction. In other words, if we establish a three-dimensional space coordinate system x, y, z, and define z as the electric discharge direction and y as the traveling direction of laser beam immediately after it has passed through the window 22, then, as shown in FIG. 9, the cross sectional area of the laser beam immediately after it has passed through the window 22 has a form in which it is narrower in the x direction and wider in the z direction.

If not only laser oscillation but also narrowing of the bandwidth are to be carried out in the arrangement shown in FIG. 1, then the length of the light resonator (laser cavity) from the front mirror 10 to the grating 30 is lengthened and it is impossible to avoid an increase in the surface area over which the laser apparatus is installed.

The narrow band excimer laser for use as a semiconductor exposure device is installed in a clean room, and it is desirable to reduce the surface areas taken up by the various pieces of equipment installed inside such a clean room which has a limited space.

Thus, this embodiment adopts an arrangement in which the distance from the front mirror 10 to the grating 30 is reduced by bending the optical axis of the laser beam using a laser beam direction altering means such as a mirror.

In FIG. 9, the mirrors 10a and 10b are positioned in such a way that the normal to the reflection plane of the mirror 10a is parallel to the plane y-z, and the normal to the reflection plane of the mirror 10b is parallel to the plane z-x. Also, the laser beam A output from the laser chamber 20 is termed beam B when reflected by mirror 10a and is termed beam C when reflected by mirror 10b; the beam C being irradiated through the window 51 and into the prisms 41 and 42.

Using such a configuration, it is possible to make the length from the front mirror 10 to the grating 30 shorter than in FIG. 1.

In the arrangement shown in FIG. 9, by using the mirrors 10a and 10b as the image rotator, and by doing high precision adjustments to the rotation about the optical axis of the laser beam and to the reflection angle of the laser beam with respect to the mirrors 10a and 10b, it is possible to realize the arrangements in which the plane containing the direction in which the width of the laser beam incident upon the beam expander is narrower is parallel to the plane containing the beam-expansion direction of the beam expander, and the beam-expanded direction of the laser beam incident upon the grating is perpendicular to the direction of the plurality of grooves of the grating.

What is claimed is:

1. A narrow band excimer laser comprising:

a laser chamber filled with a laser gas;

a laser beam output coupling mirror provided to one side of the laser chamber;

a grating having a plurality of grooves provided to another side of the laser chamber, for acting as a wavelength-selecting element; and a beam expander provided between the laser chamber and the grating, whereby a laser beam of narrowed bandwidth is output through the laser beam output coupling mirror by irradiating a laser beam generated by the electric discharge excitation in the laser chamber onto the grating via the beam expander, wherein the narrow band excimer laser further comprises:

an optical element provided between the laser chamber and the grating on an optical axis of the laser beam, for rotating the laser beam about the optical axis thereof; and supporting means for supporting the optical element and rotating the optical element about the optical axis of the laser beam, wherein the laser beam is rotated by the rotation of the optical element by using the supporting means to make adjustments such that a plane containing a direction in which a width of the laser beam incident upon the beam expander is narrower is parallel with a plane containing a direction of beam-expansion by the beam expander, and the beam expansion direction of the laser beam incident upon the grating is perpendicular to a direction of the plurality of grooves of the grating.

2. A narrow band excimer laser as claimed in claim 1, wherein the optical element is positioned between the laser chamber and the beam expander.

3. A narrow band excimer laser as claimed in claim 1, wherein the optical element is positioned between the grating and the beam expander.

4. A narrow band excimer laser as claimed in claim 1, wherein the optical element comprises an image rotator.

5. A narrow band excimer laser as claimed in claim 4, wherein the image rotator comprises a dove prism.

6. A narrow band excimer laser as claimed in claim 4, wherein the image rotator comprises at least two mirrors disposed in a predetermined positional relation.

7. A narrow band excimer laser as claimed in claim 6, wherein the at least two mirrors bend the traveling direction of the laser beam by substantially a right angle.

* * * * *